(12) United States Patent
Wurmfeld et al.

(10) Patent No.: US 11,954,166 B2
(45) Date of Patent: Apr. 9, 2024

(54) SUPERVISED AND/OR UNSUPERVISED MACHINE LEARNING MODELS FOR SUPPLEMENTING RECORDS STORED IN A DATABASE FOR RETRIEVAL

(71) Applicant: Capital One Services, LLC, McLean, VA (US)

(72) Inventors: David Kelly Wurmfeld, Fairfax, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 16 days.

(21) Appl. No.: 17/453,429

(22) Filed: Nov. 3, 2021

(65) Prior Publication Data
US 2023/0138423 A1    May 4, 2023

(51) Int. Cl.
*G06F 16/9535*    (2019.01)
*G06F 16/9538*    (2019.01)

(52) U.S. Cl.
CPC ...... *G06F 16/9538* (2019.01); *G06F 16/9535* (2019.01)

(58) Field of Classification Search
CPC .......................... G06F 16/9535; G06F 16/9538
See application file for complete search history.

(56) References Cited

U.S. PATENT DOCUMENTS

| | | | | |
|---|---|---|---|---|
| 9,026,479 | B1* | 5/2015 | Baluja | G06F 16/9038 706/12 |
| 2006/0122994 | A1* | 6/2006 | Kapur | G06F 16/367 |
| 2013/0046661 | A1* | 2/2013 | Levin | G06Q 40/02 705/30 |
| 2013/0086025 | A1* | 4/2013 | Hebert | G06F 16/3325 707/706 |
| 2013/0124298 | A1* | 5/2013 | Li | G06Q 30/0241 705/14.42 |
| 2013/0290110 | A1* | 10/2013 | LuVogt | G06Q 30/02 705/14.66 |
| 2018/0204265 | A1* | 7/2018 | Malviya | G06F 40/55 |
| 2022/0207093 | A1* | 6/2022 | Badr | H04L 67/02 |

* cited by examiner

*Primary Examiner* — Grace Park
(74) *Attorney, Agent, or Firm* — Harrity & Harrity, LLP

(57) ABSTRACT

In some implementations, a system may receive interaction data based on an interaction of a user with a terminal, wherein the interaction data indicates a location of the terminal. The system may determine a plurality of entities having a corresponding plurality of locations that are within a geographic area that includes the location of the terminal. The system may determine, based on the plurality of entities, one or more categories for categorizing a purpose associated with the interaction of the user with the terminal. The system may transmit, to a user device of the user, information that identifies the one or more categories. The system may receive, from the user device, information that identifies one or more user-specified categories of the one or more categories. The system may store, in the database, a record that includes the information that identifies the one or more user-specified categories.

20 Claims, 9 Drawing Sheets

SUPERVISED AND/OR UNSUPERVISED MACHINE LEARNING MODELS FOR SUPPLEMENTING RECORDS STORED IN A DATABASE FOR RETRIEVAL

BACKGROUND

Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples.

SUMMARY

Some implementations described herein relate to a system for applying a machine learning model to supplement one or more records stored in a database for retrieval. The system may include one or more memories and one or more processors communicatively coupled to the one or more memories. The one or more processors may be configured to receive interaction data based on an interaction of a user with a terminal, wherein the interaction data indicates at least one of a location of the terminal or a time associated with the interaction. The one or more processors may be configured to provide the interaction data as input to the machine learning model, wherein the machine learning model is trained using supervised learning and historical interactions of the user or one or more other users with the terminal or one or more other terminals. The one or more processors may be configured to receive an output, based on applying the machine learning model to the interaction data, that indicates one or more categories for categorizing a purpose associated with the interaction of the user with the terminal. The one or more processors may be configured to transmit, to a user device of the user, information that identifies the one or more categories. The one or more processors may be configured to receive, from the user device, information that identifies one or more user-specified categories of the one or more categories. The one or more processors may be configured to store a record, in the database, that includes the interaction data and information that identifies the one or more user-specified categories. The one or more processors may be configured to receive a query that indicates a requested category of the one or more user-specified categories. The one or more processors may be configured to retrieve a set of records from the database based on the query, wherein the set of records includes the record. The one or more processors may be configured to provide the set of records to a device for display.

Some implementations described herein relate to a system for applying a machine learning model to supplement one or more records stored in a database for retrieval. The system may include one or more memories and one or more processors communicatively coupled to the one or more memories. The one or more processors may be configured to receive first interaction data based on a first interaction of a first user with a first terminal, wherein the first interaction data indicates at least one of a location of the first terminal or a time associated with the first interaction. The one or more processors may be configured to receive, from a first user device, information that identifies a user-specified category associated with the first interaction. The one or more processors may be configured to store a record, in the database, that includes the first interaction data and the information that identifies the user-specified category. The one or more processors may be configured to train a machine learning model based on the user-specified category and the first interaction data. The one or more processors may be configured to receive second interaction data based on a second interaction of a second user with a second terminal, wherein the second interaction data indicates at least one of a location of the second terminal or a time associated with the second interaction. The one or more processors may be configured to transmit, to a second user device, information that identifies one or more categories for categorizing a purpose associated with the second interaction, wherein the one or more categories are determined by the trained machine learning model.

Some implementations described herein relate to a method for applying a machine learning model to supplement one or more records stored in a database for retrieval. The method may include receiving, by a system, interaction data based on an interaction of a user with a terminal, wherein the interaction data indicates a location of the terminal. The method may include determining, by the system, a plurality of entities having a corresponding plurality of locations that are within a geographic area that includes the location of the terminal. The method may include determining, by the system and based on the plurality of entities, one or more categories for categorizing a purpose associated with the interaction of the user with the terminal. The method may include transmitting, by the system and to a user device of the user, information that identifies the one or more categories. The method may include receiving, by the system and from the user device, information that identifies one or more user-specified categories of the one or more categories. The method may include storing, by the system and in the database, a record that includes the information that identifies the one or more user-specified categories.

DETAILED DESCRIPTION

Figure 1A:
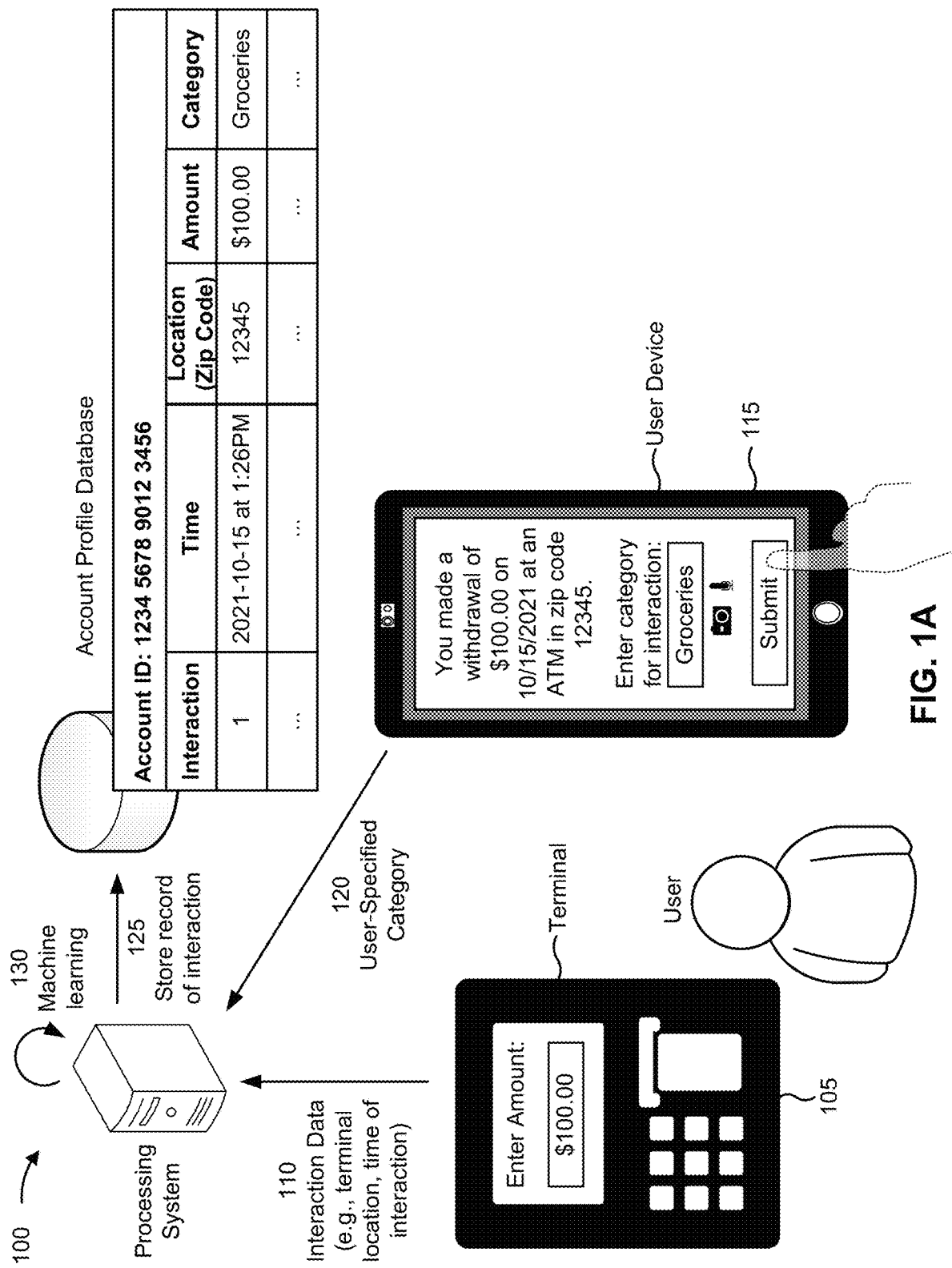
FIGS. 1A-1D are diagrams of an example implementation relating to supervised and/or unsupervised machine learning models for supplementing records stored in a database for retrieval.

The following detailed description of example implementations refers to the accompanying drawings. The same reference numbers in different drawings may identify the same or similar elements.

Various applications may utilize records and/or a record log (e.g., a collection of records) to manage and/or provide information associated with the records. For example, a record log may maintain records associated with interactions (e.g., events and/or actions) involving an account associated with the record log. Further, a user may register an account with an application that is configured to maintain a record log for the user. For example, the user may access the record log to review information associated with the interactions in the record. As a more specific example, a banking application may utilize a record log to maintain records of transactions (e.g., credits and/or debits of the account) involving an account registered to a user (e.g., an account holder) of a banking institution or other type of financial institution. In such an example, the user, via the banking application, may review record logs corresponding to financial statements and/or transaction account activity. For example, the user may monitor balances and/or cash flow based on transactions performed using the account. An interaction may include a transaction or an exchange that results in a debit or a credit to the account.

A record of a record log may be generated for an interaction via a system and stored in a database. The system may identify certain interaction data (e.g., metadata) associated with the interaction and/or may generate corresponding record metadata for a record. This metadata may include a time (e.g., timestamp or date) of the interaction, a location of the interaction, an amount associated with the interaction (e.g., an exchange amount, such as a debit or credit amount), and/or an entity (e.g., a merchant and/or vendor) associated with the interaction. For certain interactions, such as a transaction made with a transaction card (e.g., a card transaction), a user may be able to glean a purpose of the interaction from the record metadata. For example, with a card transaction, the record metadata may include information indicating the merchant involved in the interaction (e.g., a grocery store merchant). From this information, the user may be able to determine that the purpose of the particular interaction was for groceries. However, for other interactions, such as cash transactions (e.g., withdrawals of funds), record metadata may be limited to time and location of the interaction, from which it may be difficult for a user to glean the purpose of the interaction (e.g., an intended use of the cash from a withdrawal). Certain interactions (e.g., purchases made with cash) do not even have records. As such, a record log of the user's interactions stored under the user's account in a database may be incomplete and/or inaccurate for the user's retrieval and review of the records at a later time.

Some implementations described herein enable a processing system to assist with categorizing interactions with a terminal (e.g., cash transactions) using one or more categories. The one or more categories may be included in information associated with the interaction when the information, which would be limited otherwise, is stored in a database as a record. To enable the processing system to assist with categorizing the interaction, the processing system may receive data based on the interaction (e.g., interaction data) from the terminal. For example, the interaction data may indicate at least one of a location of the terminal or a time associated with the interaction. The processing system may provide, to a user device, suggestions of one or more categories for categorizing a purpose associated with the interaction, for example, based on the location of the terminal in the interaction. Additionally, or alternatively, a user may manually input a category (e.g., in a dedicated entry field). The processing system may receive the user-specified category and store a record of the interaction that includes the user-specified category along with the interaction data.

Thus, when the processing system retrieves the record of the interaction (e.g., by looking up the interaction under the user's account), the category (e.g., the purpose) of the particular interaction can be presented for display or otherwise used in connection with the interaction. Without the ability to categorize interactions, the user would not be able to know for what purposes certain interactions were, such as with cash transactions (e.g., withdrawals of funds), and therefore the records of the interactions would be incomplete and/or inaccurate. Additionally, when the user performs a search of records for a particular category, such interactions (e.g., cash transactions) are now able to be included in the search results. Previously these interactions would not have shown up in the search results, for example, because the interaction data associated with those interactions does not include a category or other information from which a purpose could be gleaned (e.g., a merchant in the interaction as is included in the data of transactions made with a transaction card). Accordingly, the system's ability to categorize such interactions supplements the records stored in a database so as to make the records more complete and accurate for retrieval from the database.

In some implementations described herein, the processing system may use machine learning to determine suggestions of the one or more categories to provide to the user (e.g., to a user device). For example, the processing system may train a machine learning model using supervised and/or unsupervised learning, along with other variables, such as historical interactions of the user in a particular interaction and/or other users with the terminal in the interaction and/or with other terminals, previously-received user-specified categories (e.g., user-specified categories included in records stored in the database), and/or a location of the terminal. The use of machine learning improves the accuracy of the suggestions to the user, and creates more uniformity in the categories associated with the records, further improving retrieval of accurate items from the records.

FIGS. 1A-1D are diagrams of an example 100 associated with supervised and/or unsupervised machine learning models for supplementing records stored in a database for retrieval. As shown in FIGS. 1A-1D, example 100 includes a processing system, an account profile database, a user device, a terminal, and an entity profile database. These devices are described in more detail in connection with FIGS. 3 and 4.

As shown in FIG. 1A, and by reference number 105, a user (e.g., an account holder) may engage in an interaction (e.g., an exchange or a transaction) with a terminal (e.g., an automated teller machine (ATM), a kiosk, or a point-of-sale (PoS) terminal or system). The interaction may involve an exchange of cash between the user and a third party (e.g., a bank, a credit union, a merchant, or a vendor) via the terminal. For example, as shown in FIG. 1A, the user may withdraw cash from an ATM for a set amount, as selected by the user. The user may enter the amount (e.g., "$100.00" as shown in FIG. 1A) directly into the ATM (e.g., via a keypad or touchscreen interface). Alternatively, the user may set the amount on a user device (e.g., via a mobile application installed and executing on the user device or a web-based application accessed over a network on the user device), which may interact with the ATM (e.g., by tapping the user device to a designated surface of the ATM) to initiate and/or complete the interaction.

The interaction may have interaction data associated with the interaction. The interaction data may include, but is not limited to, a location of the terminal (e.g., the zip code in which the terminal is located or an address at which the terminal is located), a time of the interaction (e.g., timestamp and/or date), and/or an amount associated with the interaction (e.g., an amount of cash exchanged). Additionally, or alternatively, the interaction data may include a terminal identifier (e.g., a unique series of alphanumeric characters by which the terminal may be identified). The terminal identifier may be associated with the terminal (e.g., information relating to the terminal), for example, in a terminal profile database in communication with the processing system over a network. As an example, the terminal profile database may store information that identifies a location of the terminal (e.g., a geographic location, such as a zip code, a city, an address, and/or a street address) in association with the terminal identifier. From the terminal identifier, the processing system may obtain information regarding the terminal (e.g., the terminal location).

As shown by reference number 110, a processing system may receive the interaction data from the terminal. Additionally, or alternatively, the processing system may receive the interaction data from the user device (e.g., in scenarios in which the user device is used in the interaction). The processing system may also receive, from the terminal and with the interaction data, an account identifier (e.g., an account ID number, a primary account number (PAN), or a virtual card number) associated with the user's account. The processing system may use the account identifier to associate the interaction (e.g., the interaction data) with the user's account.

As shown by reference number 115, the processing system may provide a notification of the interaction to a user device (e.g., over the network), where details of the interaction may be displayed (e.g., on a display of the user device via the user interface of the mobile application installed on the user device). For example, after receiving the interaction data and account identifier from the terminal, the processing system may identify contact information of the user (sometimes called "user contact information"), such as the user's name, address, phone number, application ID (e.g., associated with the mobile application that executes on the user device), and/or email address, associated with the account identifier and stored under the user's account in the account profile database. The processing system may then transmit the notification to the user based on the contact information (e.g., to the user device as a short message service (SMS) text or an internal message within the mobile application).

In some implementations, the processing system may provide a notification to the user device for every interaction that is detected by the processing system. Alternatively, the processing system may identify specific types of interactions requiring notifications, such as interactions without information indicating a purpose, use, or intended use of the interaction (e.g., cash transactions). For example, the processing system may identify the interaction as a cash transaction (e.g., withdrawal of cash from an ATM), and send a notification to the user device regarding the interaction. In contrast, for a transaction made with a transaction card (e.g., a credit or a debit card), the processing system may determine that a notification to the user is not necessary (e.g., because the user is able to glean the purpose of the interaction from the interaction data, such as information identifying a merchant name).

Additionally, or alternatively, the processing system may tag certain interactions (e.g., the interaction data) as being unnotified (e.g., no notification was sent to the user for the particular interaction or a notification was not confirmed as being read). The processing system may provide later access by the user to the interaction data of each of the tagged interactions (e.g., via the mobile application installed and executing on the user device). For example, an interface of the mobile application may display, on the user device, a list of the tagged interactions. For each interaction, the list may include the interaction data or a subset of the interaction data. Additionally, or alternatively, the user may select a particular interaction from the list, which may generate a new interface on the display providing details of the interaction (e.g., the notification of the interaction, as shown in FIG. 1A).

As further shown by reference number 115, the user may be prompted to enter a user-specified category for the interaction (e.g., "Groceries" as shown in FIG. 1A). For example, an entry field, in which the user may input the user-specified category, may be provided for display based on the notification described above. Alternatively, in scenarios in which the user accesses a list of tagged interactions as described above, the entry field may displayed on the interface resulting from the user's selection of the particular interaction from the list. The user may input information corresponding to the category in the entry field (e.g., via a physical keyboard, a virtual keyboard, or a voice entry). The user may be provided with an option (e.g., in an interface of the mobile application) to skip and/or save for a later time the categorizing of the interaction (e.g., in a scenario in which the user is unsure of a purpose for the interaction with which to categorize the interaction). As shown by reference number 120, the processing system may receive information that identifies the user-specified category (or information indicating the user declining to provide a user-specified category) from the user device. The processing system may also receive, with the user-specified category, an interaction identifier associating the user-specified category with the particular interaction. In instances in which the user declined to provide a user-specified category, the processing system may tag the interaction for later access and/or review in a similar manner as described above.

As shown by reference number 125, the processing system may store a record of the interaction in an account profile database under the user's account, which may be associated with an account identifier. The record may include the interaction data (e.g., "Time," "Location (Zip Code)," and "Amount") received from the terminal and/or the information identifying the user-specified category (e.g., "Category"), if provided. The record may be associated with the interaction identifier received with the user-specified category (e.g., "Interaction 1" as shown in FIG. 1A).

In some implementations, the user may retrieve the record of the interaction on the user device (e.g., via the mobile application), for example, at some time after the interaction has been completed and the corresponding record stored in the database. As an example, the user device may display, via an interface of the mobile application, a list of tagged interactions, as described above. The user then may be able to select a particular selection from the list, and input a category of the interaction (e.g., if the user declined to provide one earlier at the time of the interaction). Additionally, or alternatively, the user may be able to search an entire record log of all the records of interactions to find a particular interaction for which the user desires to add a category and/or modify an existing category. Additionally, or alternatively, the user, via the user device, may be able to supplement the record with a note about the interaction. The note may be input as text, audio (e.g., a voice memo input via a microphone of the user device), or an image and/or video recording (e.g., via a camera of the user device, stored in a memory of the user device, or accessed from a remote database over a network). For example, the user may take a photo of a receipt from a transaction in which cash obtained from the interaction (e.g., withdrawal) was used, a photo of a product purchased in the transaction, and/or a photo of the location where the transaction occurred. The note may be stored as part of the record of the interaction in the database. As such, the user may be able to have a more detailed record of the interaction when accessed at a later date.

In some implementations, the user may be able to divide a particular interaction into multiple sub-interactions in the record stored in the account profile database (e.g., if cash withdrawn from an ATM is used for multiple different purposes). The user may be able to specify interaction data (e.g., time, amount, location, and/or category) for each sub-interaction. For example, the user device may display an interface (e.g., of the mobile application) presenting the record of a particular interaction. The interface may present an option to add a sub-interaction, which the user may select (e.g., by pressing a designated button in the interface). In response, one or more entry fields may be displayed on the interface in which the user may enter the interaction data of the sub-interaction. Alternatively, the interface may have entry fields designated for entry of sub-interactions pre-populated on the display. The processing system may receive data corresponding to the information entered into the entry fields, and may store the data with the record in the account profile database.

As shown by reference number 130, the processing system may perform machine learning (e.g., train a machine learning model, as described in more detail in connection with FIG. 2 below), using the interaction data and/or the user-specified category, to be able to provide suggestions of categories in future interactions, as described in more detail below. The machine learning model may be trained using supervised and/or unsupervised learning and historical interactions of the user and/or one or more other users with the terminal and/or one or more other terminals. For example, the processing system may obtain historical interaction data from records of historical interactions of the user (e.g., interactions with the terminal and/or other terminals) stored in the account profile database based on the account identifier associated with the user's account. Additionally, or alternatively, the processing system may obtain historical interaction data from records of historical interactions of the other users (e.g., with the terminal and/or other terminals), which may also be stored in the account profile database, based on the account identifiers respectively associated with the users' accounts.

Figure 1B:
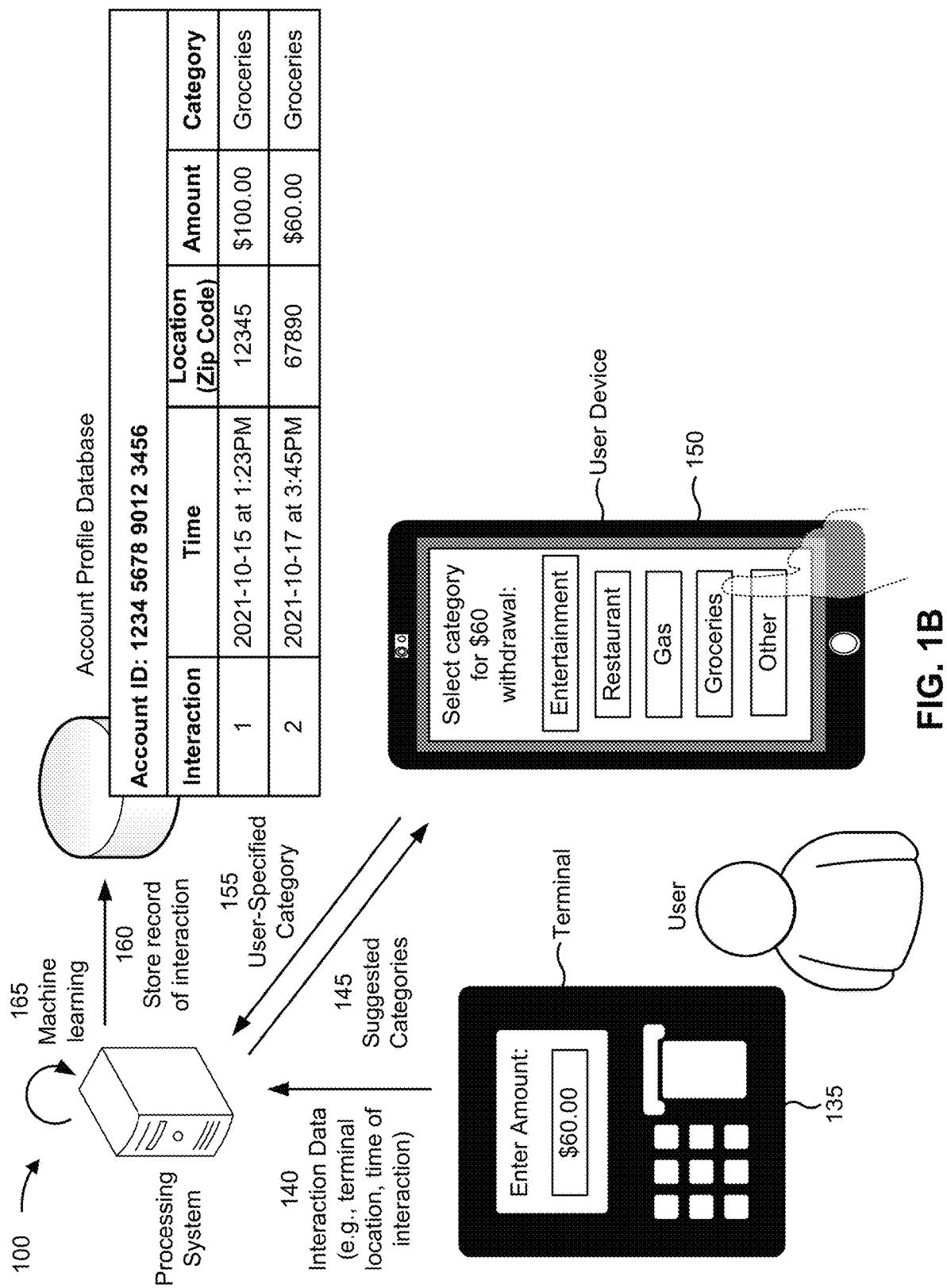

As shown in FIG. 1B, and by reference number 135, the user may engage in another interaction with another terminal. The interaction may also involve an exchange of cash between the user and a third party via the terminal. For example, as shown in FIG. 1B, the user may withdraw cash from an ATM for a set amount, as selected by the user (e.g., "$60.00" as shown in FIG. 1B).

As shown by reference number 140, the processing system may receive interaction data (e.g., terminal location, time of interaction, interaction amount) from the terminal (or from the user device). The processing system may then provide a notification to the user (e.g., to the user device) of the interaction, in a similar manner as with the interaction shown in FIG. 1A and described above.

Additionally, as shown by reference number 145, the processing system may provide, to the user device, multiple selectable options of suggested categories for the purpose of the interaction (e.g., "Entertainment," "Restaurant," "Gas," "Grocery," or "Other"). The suggested categories may be based on one or more factors and/or one or more rules stored and applied by the processing system.

In some implementations, the processing system may determine suggested categories based on the location of the terminal. For example, the processing system may identify one or more entities (e.g., merchants or vendors) within a geographic area that includes or is near the terminal used in the interaction. Using the location of the terminal (e.g., as provided in the interaction data or as obtained from a terminal profile database based on the terminal identifier included in the interaction data), the processing system may search an entity profile database to identify the one or more entities having a geographic location (e.g., zip code and/or geographic coordinates) that are within a defined geographic area. For example, the processing system may identify entities in the same zip code as the terminal and/or entities within a threshold distance of the terminal (e.g., 5 miles, 2 miles, 1 mile, and so on), which may be determined based on geographic coordinates, a street address, or the like. The processing system may then identify a category for each of the identified entities (e.g., a grocery store, a gas station, a restaurant), which may also be stored in the entity profile database for each entity, and may determine and provide suggested categories corresponding to the identified category. For example, the processing system may count the number of instances for each identified category, and may provide suggested categories corresponding to the categories having the highest count (e.g., the top 4 categories). Alternatively, the processing system may transmit, to the user device, information that identifies multiple suggested entities (e.g., merchants) identified as described above. The processing system may receive, from the user device, an indication of a user-specified entity of the multiple suggested entities, and may store an indication of the user-specified entity (and/or a category of the user-specified entity, which may be determined using an entity profile database, as described elsewhere herein) in a record associated with the interaction.

Additionally, or alternatively, the processing system may group or cluster terminals having similar characteristics (e.g., using machine learning or one or more rules), and may determine and provide suggested categories based on the cluster. For example, the processing system may group all terminals within the same geographic area (e.g., same zip code or within a threshold distance of each other) in a cluster. Additionally, or alternatively, the processing system may group all terminals within proximity to a same entity or type of entity (e.g., having a same category), such as all terminals within a threshold distance of a particular restaurant (e.g., at a particular address), a particular restaurant chain (e.g., all restaurants associated with a particular merchant), or any restaurant (e.g., all entities categorized as restaurants). Each terminal in the cluster may be tagged or identified as being in the cluster in a terminal profile database. When the processing system receives interaction data for an interaction with a particular terminal, the processing system may look up, from the terminal identifier received as part of the interaction data, the cluster of which the terminal is a part. The processing system may then identify all the terminals in the cluster, and then search the account profile database for all interactions involving any terminal in the cluster. The processing system may then provide suggested categories based on the categories associated with those interactions, such as the most common categories (e.g., those with the greatest number of instances)

associated with the cluster of terminals, which may be determined based on historical user-specified categories, as described in more detail herein.

In some implementations, the processing system may apply one or more rules to provide suggested categories based on the time of the interaction (e.g., time of day, day of the week, or specific date) received as part of the interaction data from the terminal. For example, if the interaction occurs in the morning (e.g., between 7:00 AM and 12:00 PM), then the processing system may apply a rule to provide suggested categories applicable in the morning (e.g., "Coffee," "Breakfast," "Gas," etc.). As another example, if the interaction occurs over the weekend, then the processing system may apply a rule to provide suggested categories applicable to the weekend (e.g., "Restaurants," "Movies," "Sporting Events," etc.). As another example, if the interaction occurs in the summer, then the processing system may apply a rule to provide suggested categories applicable in the summer (e.g., "Ice Cream," "Water Parks," etc.). In some implementations, the processing system may store or look up hours or operation of entities (e.g., within a threshold distance of the terminal), and may suggest one or more entities and/or one or more entity categories based on entities that are open for business at or shortly after the time of the interaction (e.g., within a threshold time of the interaction).

In some implementations, the processing system may determine suggested categories based on information related to the user (e.g., the user's demographic information or the user's interaction history or transaction history). For example, the processing system may obtain the user's demographic information (e.g., sex and/or age) from the account profile database, in which the user's demographic information may be stored under the user's account and associated with the account identifier. The processing system may store rules for suggestions to make for different demographics or combination of demographics. As an example of a rule, if the user is a female, then the processing system may suggest a category of a "Salon" (e.g., if the terminal is within a threshold distance of a salon). As another example of a rule, if the user's age is within an age group of 21-30, then the processing system may suggest a category of a "Club" (e.g., if the terminal is within a threshold distance of a club and/or at a particular time of day, such as evening or night).

As another example, the processing system may obtain the user's interaction history (e.g., transaction history) from a log of records of historical interactions (e.g., transactions) stored in the account profile database, where the interaction data for each interaction indicates one or more categories. The processing system may count the number of instances of each category in the log of records, and may suggest the categories with the highest count (e.g., the top 4 categories). The count may be performed across the entire interaction history or a subset of the interaction history (e.g., the past 6 months). Additionally, or alternatively, the processing system may identify a subset of interactions from the interaction history that occur on the same day or group of days (e.g., weekends, a particular day of the week, or a particular day of the month), in a similar time frame as the interaction (e.g., between 7:00 AM and 12:00 PM), and/or in a same month or group of months (e.g., months making up a particular season). The processing system may count the number of instances for each category in the identified subset, and may suggest categories with the highest count (e.g., the top 4 categories).

In some implementations, the processing system may determine suggested categories based on the interaction history of other users. For example, the processing system may obtain the other users' interaction history from logs of records of the users' historical interactions, which may also be stored in the account profile database under the users' respective accounts, each account being associated with a respective account identifier. Similar to using the user's own interaction history, the processing system may count the number of instances of each category in the logs of records for all users, and may suggest categories with the highest count (e.g., the top 4 categories). Alternatively, the processing system may count the number of instances of each category in the logs of records for a subset of all the users, for example, for users with similar demographic information as the user, where the demographic information for each other user may also be stored in the account profile database under the users' respective accounts. For example, if the user is a male and/or has an age between 21 and 30, then the processing system may count the categories from the records of just male users and/or users between the ages of 21 and 30. The count may be performed across the entire interaction history of each user or a subset of the interaction history (e.g., the past 6 months). Additionally, the processing system may use the interaction history of the user and the other users with any of the rules described above.

Additionally, or alternatively, the processing system may group or cluster users having similar interaction history (e.g., interactions made with the same or similar entity, same category of entity, same or similar times or time periods, and/or similar interaction amounts). For example, the processing system may search records of historical interactions of users (e.g., all users or a subset of users) and identify users (e.g., by the account identifier) associated with interaction data indicating interactions with restaurants or a particular restaurant. As another example, the processing system may identify users associated with interaction data indicating interactions occurring within a particular time period (e.g., summer). The processing system may cluster all users where the number of instances of those interactions satisfies a threshold number.

Additionally, or alternatively, the processing system may group or cluster users having similar characteristics, and may determine and provide suggested categories based on the cluster. For example, the processing system may group all users with the same demographic information (e.g., sex or age range) in a cluster. Each user in the cluster may be tagged or identified as being in the cluster in the account profile database. When the processing system receives interaction data for an interaction with a particular user, the processing system may look up, from the account identifier received with the interaction data, the cluster of which the user is a part. The processing system may then identify all the users in the cluster, and then search the account profile database for all interactions involving each user in the cluster. The processing system may then provide suggested categories based on the categories associated with those interactions.

In some implementations, the processing system may determine suggested categories based on the interaction amount received as part of the interaction data from the terminal. For example, if the interaction amount is $40 or less, then the suggested categories may be one or more of "Casual Restaurants," "Coffee," "Entertainment," etc. If the interaction amount is between $40 and $100, then the suggested categories may be one or more of "Entertainment," "Gas," "Shopping," "Groceries," etc. If the interaction amount is greater than $100, then the suggested categories may be one or more of "Entertainment", "Shopping," "Fine Dining," etc.

The processing system may combine one or more of the implementations described above. For example, the processing system may apply a first factor and/or a first rule (e.g., geographic location of the terminal) to determine a first set of suggested categories, and then may apply a second factor and/or a second rule to refine and/or narrow the suggested categories. Additionally, or alternatively, the processing system may apply multiple factors and/or rules (e.g., two, three, or more) to determine the suggested categories. The processing system may then provide the refined suggested categories to the user device.

Additionally, or alternatively, the processing system may determine and provide suggested categories based on the machine learning model (e.g., with or without clustering users and/or terminals), as described in more detail below in connection with FIG. 2.

As shown by reference number 150, the selectable options of the suggested categories may be displayed on the user device. The user may then select one of the options as a user-specified category. For example, the user may select a button corresponding to the desired option (e.g., "Groceries"), such as via the touchscreen display of the user device. If the user determines that none of the suggested categories are appropriate, the user may select to input a separate user-specified category (e.g., by manually entering the category). For example, the user may select an option for "Other," which may generate a dedicated entry field in which the user may manually enter the category. Alternatively, the user may choose an option to decline or save for a later time to provide the user-specified category.

As shown by reference number 155, the processing system may receive information that identifies the user-specified category from the user device. In some implementations, the processing system may receive an interaction identifier associating the user-specified category with the particular interaction. As shown by reference number 160, the processing system may store a record of the interaction in the account profile database under the user's account (e.g., based on the account identifier). The record may include the interaction data (e.g., "Time," "Location (Zip Code)," and "Amount") received from the terminal and/or the information identifying the user-specified category (e.g., "Category"). The record may be associated with the interaction identifier (e.g., "Interaction 2" as shown in FIG. 1).

In some implementations, the processing system may store a record associated with the interaction without sending a notification to the user and without categorizing the interaction. When the user accesses a record log of the historical interactions (e.g., via the mobile application installed on the user device or via a website), each record associated with a particular interaction (e.g., a particular type of interaction, such as ATM withdrawals or uncategorized interactions) may include suggested categories for the user to select. The suggested categories may be determined and provided in a similar manner as described above. Additionally, or alternatively, the user may be presented with an option to add a category or modify a category for a particular interaction. After receiving a selection of this option from the user device, the processing system may provide the suggested categories for the interaction.

Additionally, or alternatively, the user may interact with the user device to supplement the record with a note about the interaction and/or divide a particular interaction into multiple sub-interactions in the record stored in the account profile database, as described above in connection with FIG. 1A.

As shown by reference number 165, the processing system may perform machine learning (e.g., train and/or retrain the machine learning model), using the interaction data and/or the user-specified category, to be able to refine and provide more accurate suggestions of categories in future interactions. Details of training (and re-training) a machine learning model are described below in connection with FIG. 2.

Figure 1C:
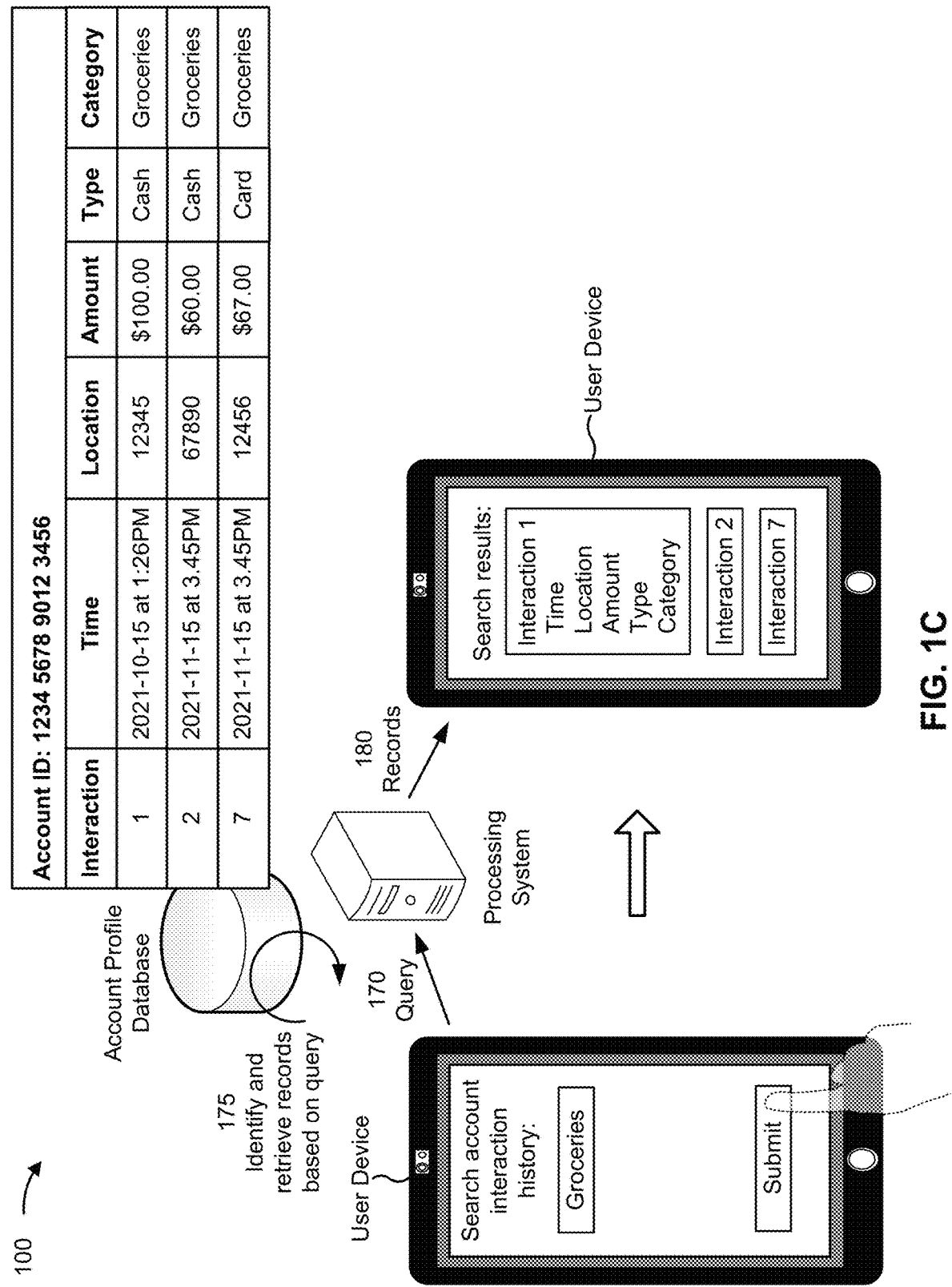

In some implementations, as shown in FIG. 1C, the user may be able to retrieve all records related to a particular category of interaction (e.g., records that include interaction data with a tag of the category). For example, the user may perform a search of all the records of past interactions stored in the database (e.g., via the mobile application installed and executing on the user device). The records may indicate the type of interaction (e.g., cash interactions or card interactions). The card interactions may include data as part of the interaction that identifies a category and/or data relating to the category (e.g., a merchant name). The cash interactions may have categories as previously specified by the user (e.g., the user-specified categories). The user may input and submit, via the user device, a search query (e.g., a desired category). For example, the user may manually input and submit the search query, as shown in FIG. 1C, or may select from a set of suggested search queries (e.g., as provided via the mobile application). As shown by reference number 170, the processing system may receive, from the user device, the search query. Then, the processing system may search the account profile database for records of interactions that have a same or similar category as the search query and/or that relate to the search query. As shown by reference number 175, the processing system may identify and retrieve records based on the query (e.g., all records that include and/or relate to the query). As shown by reference number 180, the processing system may provide information related to each identified record to the user device for display.

Additionally, or alternatively, when the interaction history or individual interactions are displayed via the user device, the categories of those interactions may be displayed. Similarly, when a breakdown of a budget or expenses by category is displayed via the user device, the interactions (e.g., cash transactions) may be included in that information based on the category. This may be done via the mobile application installed on the user device and/or via a web-based application accessed over a network (e.g., a banking website).

Without being able to categorize certain interactions (e.g., cash transactions), the record log of historical interactions would be incomplete and inaccurate, and therefore, such uncategorized interactions would not be retrieved as results of the search query. As such, the user would not have a complete picture of the account's interaction history, and therefore could not fully track and/or monitor activity on the account. Enabling the processing system to include and/or add a category to a record for each interaction allows for a more complete record of interactions, thus improving the retrieval of records from the database.

Figure 1D:
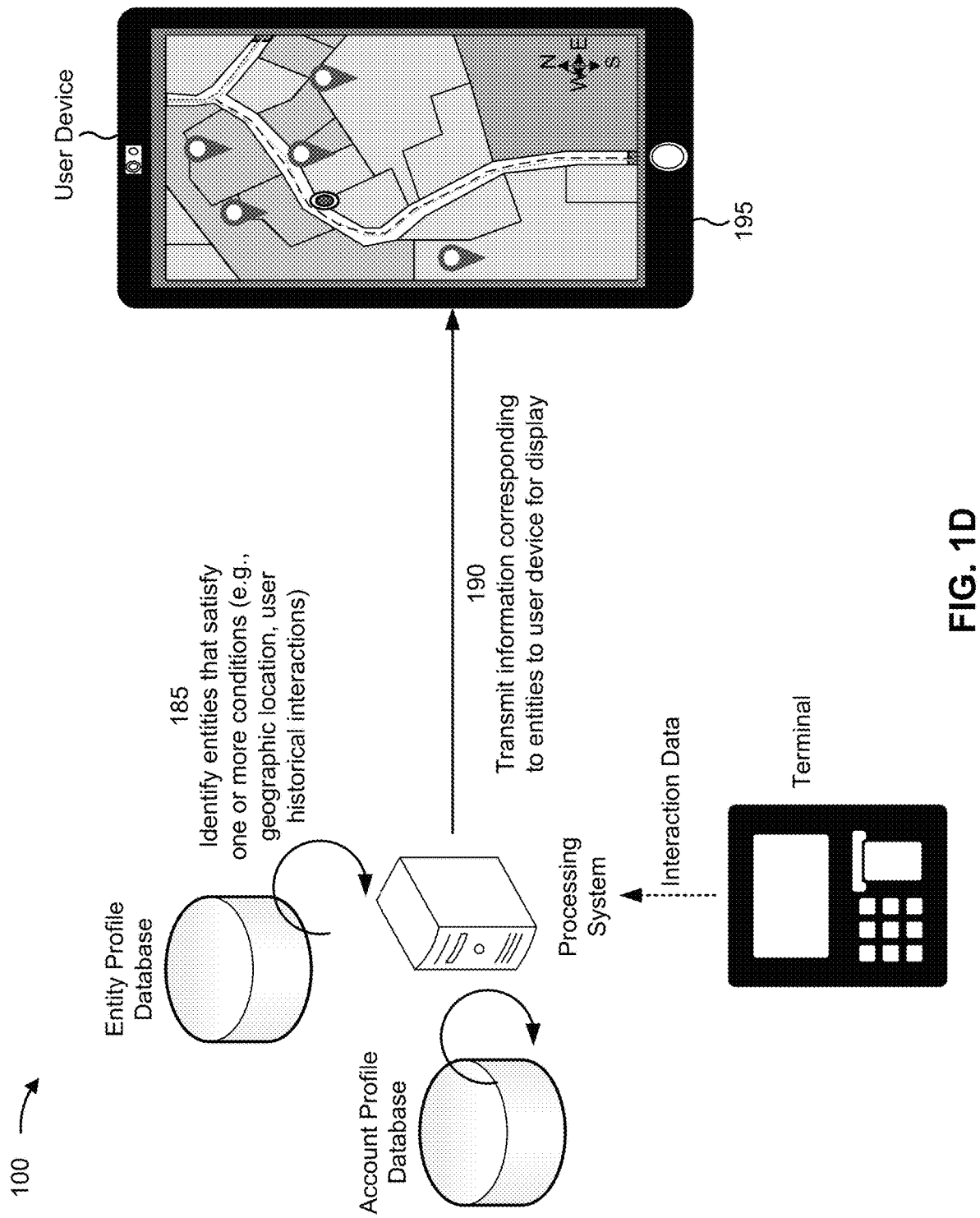

In some implementations, as shown in FIG. 1D, after the user has completed an interaction (e.g., withdrawn cash from an ATM), the processing system may be able to provide (e.g., via the mobile application) suggestions of one or more entities where the user may engage in a transaction (e.g., spend cash obtained in the interaction). The processing system may provide the suggestions automatically after a triggering event (e.g., after receiving interaction data from the terminal, after receiving the user-specified category from the user device, after storing the record of the interaction, or after a threshold amount of time from the time the interaction was completed). For example, after the triggering event, the processing system may prompt the user via a message or notification on the user device (e.g., SMS text or an internal message within the mobile application installed on the user device) asking if the user would like suggestions for entities. If the processing system receives information indicating an affirmative response (e.g., a reply of "YES" or a selection of a "YES" button on the user device), then the processing system may search a database of entities (e.g., an entity profile database) to suggest to the user. The entity profile database may store information about each entity, such as entity location (e.g., address), entity contact information, and one or more categories associated with the entity (e.g., grocery, gas, restaurant, entertainment). Each entity may be associated with an entity identifier. Additionally, or alternatively, the user may initiate the recommendation process. For example, the user may select an option (e.g., via an application interface on the user device) to provide suggestions of entities.

As shown by reference number 185, using the interaction data received from the terminal and/or interaction data from records (e.g., of historical interactions of the user) stored in the account profile database under the user's account (e.g., associated with the user's account identifier), the processing system may identify one or more entities that satisfy one or more conditions in connection with the interaction. The processing system may access information (e.g., geographic location or category) about the one or more entities from an entity profile database in connection with the processing system over a network. As an example, the condition may be that the one or more entities are within a geographic area of the user device (e.g., within a threshold distance of the user device).

As shown by reference number 190, the processing system may transmit information corresponding to the identified entities to the user device for display. In some implementations, as shown in FIG. 1D, the displayed interface may be in the form of a map with each of the entities being shown with a location marker. The user could select a particular entity by clicking on the location marker, which may provide information about the entity (e.g., name, category, or contact information). Additionally, or alternatively, the processing system may provide information that identifies the entities in the form of a list. Additionally, or alternatively, the processing system may identify categories for the entities (e.g., a grocery store, a gas station, a restaurant, etc.), for example, from an entity profile database. The processing system may then provide the entities grouped by category and/or may provide the categories to the user device to be displayed (e.g., in order of categories having the highest number of instances).

In some implementations, the processing system may group the entities, that satisfy one or more of the conditions, together based on a common category. For example, the processing system may group all the restaurants into a group, all the gas stations into a group, all the grocery stores into a group, etc. The processing system then may provide information regarding the entities to the user device (e.g., via the application interface) in their groups. Additionally, or alternatively, the processing system may provide just the categories of the groups (e.g., with the groups having more entities listed first).

Although FIGS. 1A-1D show a single user and suggested categories based on historical input by that user, including interactions with two different terminals (e.g., a first interaction with a first terminal and a second interaction with a second terminal) as shown in FIGS. 1A and 1B, in some implementations, suggested categories for one user (e.g., a first user) may be based on historical input by another user (e.g., a second user) or a group of users (e.g., in a same cluster as the first user). Additionally, or alternatively, the first terminal and the second terminal may be the same terminal. Additionally, implementations described herein may be performed in connection with a mobile application installed and executing on the user device and/or in connection with a web-based application accessible, by the user device, over a network (e.g., a website).

As described above, the processing system enables a user (e.g., account holder) to categorize specific interactions (e.g., cash transactions) that otherwise would have limited information associated with the interactions. Through the user-specified categories for the interactions, the records of the interactions are supplemented in a way so as to provide more complete record of interactions that fit into a particular category. Thus, the more complete record improves the database retrieval and results from particular interaction category queries.

As such, the user is able to better track and/or monitor activity with the account. As indicated above, FIGS. 1A-1D are provided as an example. Other examples may differ from what is described with regard to FIGS. 1A-1D.

Figure 2:
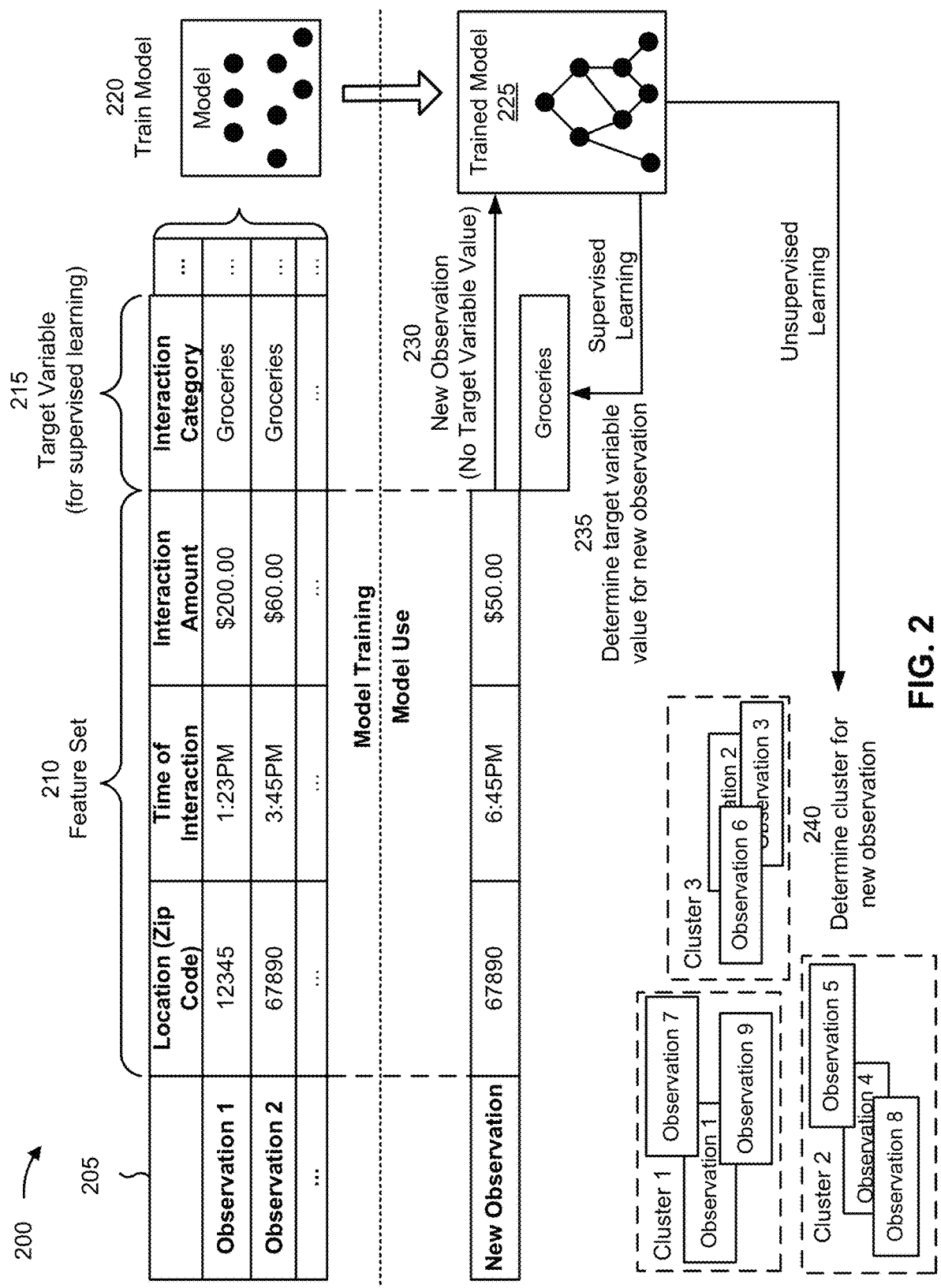
FIG. 2 is a diagram illustrating an example of training and using a machine learning model in connection with supplementing records stored in a database for retrieval.

FIG. 2 is a diagram illustrating an example 200 of training and using a machine learning model in connection with supplementing records stored in a database for retrieval. The machine learning model training and usage described herein may be performed using a machine learning system. The machine learning system may include or may be included in a computing device, a server, a cloud computing environment, or the like, such as the processing system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from a user device, a terminal, a processing system, an account profile database, and/or an entity profile database, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device, the terminal, the processing system, the account profile database, and/or the entity profile database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a location of the terminal (e.g., a zip code in which the terminal is located, or a terminal identifier that identifies a terminal and corresponds to a particular location, such as a zip code, a city, or an address), a time of an interaction at the terminal (e.g., a time of day and/or a date), an interaction amount (e.g., an ATM withdrawal amount), and so on. As shown, for a first observation, the first feature may have a value of "12345," the second feature may have a value of "1:23 PM," the third feature may have a value of "$200.00," and so on. These features and feature values are provided as examples, and may differ in other examples. For example, the feature set may include one or more of the following features: demographic information of the user, a type of the interaction (e.g., a withdrawal of funds or a deposit of funds), and/or an interaction history of the user (e.g., all interactions of the user using one or more accounts associated with the user, and/or interactions within a particular time period, such as the most recent year, the most recent 6 months, the most recent month, or the like).

In some implementations, the observations used to train a machine learning model may be user-specific. For example, a machine learning model may be trained for and/or applied to a particular user, and the observations may be based on interactions (e.g., transactions) associated with that particular user. Alternatively, the observations used to train a machine learning model may be associated with other users (e.g., other account holders from the same financial institution) obtained from the account profile database and associated with respective account identifiers. For example, the observations may be based on interactions of all users having records stored in the account profile database. Alternatively, the observations may be based on interactions of a subset of users, such as one or more clusters of users to which the user in the interaction belongs (e.g., based on specific common characteristics, as described below). Thus, the processing system and/or the machine learning system may train multiple machine learning models for different users and/or clusters of users, and may select a machine learning model to be applied to determine suggested categories for a user based on the user and/or a cluster to which the user belongs.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is an interaction category, which has a value of "Groceries" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of "67890," a second feature of "6:45 PM," a third feature of "$50.00," and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed.

As an example of a supervised learning model, the trained machine learning model 225 may predict a value of "Groceries" for the interaction category for the new observation, as shown by reference number 235. Based on this prediction, the machine learning system may provide a first recommendation. The first recommendation may include, for example, one or more suggested categories for an interaction between the user and the terminal. In some implementations, the machine learning model may determine, for each category of multiple categories, a probability that the interaction is associated with that category. For example, the machine learning model may determine a first probability that the interaction is associated with a first category, a second probability that the interaction is associated with a second category, and so on. The machine learning model may output a set of categories for which a corresponding set of probabilities satisfy a threshold. These categories may be used by the processing system as the suggested categories that are indicated to the user device, as described above in connection with FIG. 1B.

In some implementations, the processing system and/or the machine learning system may train and/or apply an unsupervised machine learning model, such as to cluster users or to cluster terminals. To cluster users, the observations may include demographic information and/or transactions histories of the users, among other examples. To cluster terminals, the observations may include a terminal location and/or information that identifies entities within a threshold distance of a terminal, among other examples. In these cases, the output of the machine learning model may include information that identifies a cluster to which a new observation belongs and/or information that indicates a degree of similarity between the new observation and one or more other observations. As an example of an unsupervised learning model, the trained machine learning model 225 may classify (e.g., cluster) the new observation in a cluster, as shown by reference number 240. The observations within a cluster may have a threshold degree of similarity. For example, the terminals in the cluster of terminals may all have locations in a same geographic area (e.g., in the same zip code) or within a set proximity (e.g., miles) to a same entity (e.g., a specific merchant) or category of entity (e.g., a grocery store). As another example, the users in the cluster of users may have the same or similar demographic information (e.g., sex, age, or age range) or may have the same or similar pattern of interactions (e.g., interactions at similar times and/or in similar categories based on the historical interaction data of the users).

In this way, the machine learning system may apply a rigorous and automated process to provide suggestions of categories for interactions between the user and the terminal. The machine learning system enables recognition and/or identification of tens, hundreds, thousands, or millions of features and/or feature values for tens, hundreds, thousands, or millions of observations, thereby increasing accuracy and consistency and reducing delay associated with providing suggestions of categories for interactions between the user and the terminal relative to requiring computing resources to be allocated for tens, hundreds, or thousands of operators to manually provide suggestions of categories for interactions between the user and the terminal using the features or feature values.

As indicated above, FIG. 2 is provided as an example. Other examples may differ from what is described in connection with FIG. 2.

Figure 3:
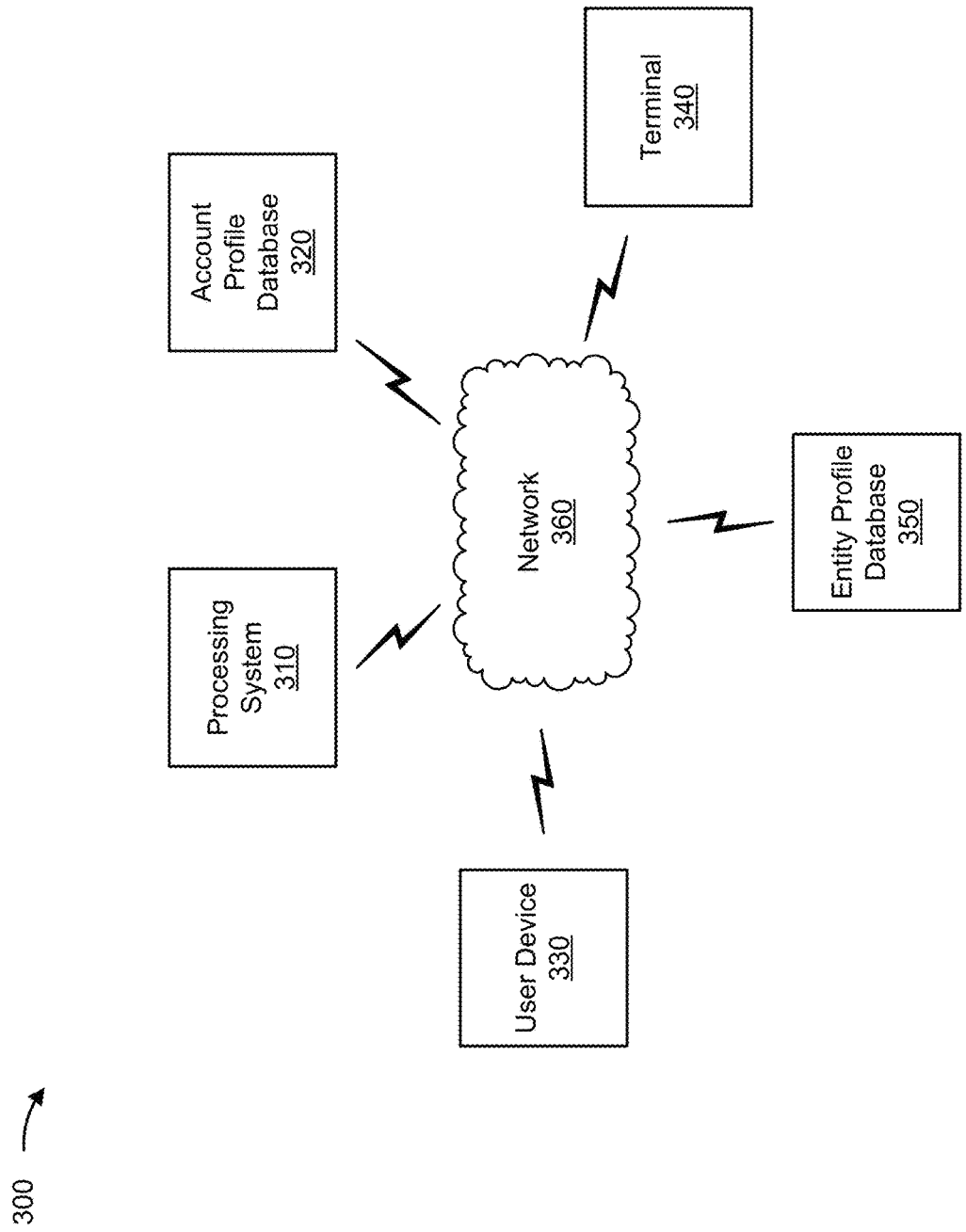
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a processing system 310, an account profile database 320, a user device 330, a terminal 340, an entity profile database 350, and a network 360. Devices of environment 300 may interconnect via wired connections, wireless connections, or a combination of wired and wireless connections.

The processing system 310 includes one or more devices capable of processing, authorizing, and/or facilitating an exchange (e.g., a transaction). For example, the processing system 310 may include one or more servers and/or computing hardware (e.g., in a cloud computing environment or separate from a cloud computing environment) configured to receive and/or store information associated with processing an electronic exchange. The processing system 310 may process an exchange, such as to approve (e.g., permit, authorize, or the like) or decline (e.g., reject, deny, or the like) the exchange and/or to complete the exchange if the exchange is approved. The processing system 310 may process the exchange based on information received from a terminal, such as interaction data (e.g., information that identifies an interaction amount, a merchant, a time of the interaction, a location of the interaction or terminal, or the like), account information communicated to the terminal by a physical medium (e.g., a transaction card, a mobile device executing an application, or the like) and/or information stored by the processing system 310 (e.g., for record-keeping).

The processing system 310 may be associated with a financial institution (e.g., a bank, a lender, a credit card company, or a credit union) and/or may be associated with a transaction card association that authorizes an exchange and/or facilitates a transfer of funds. For example, the processing system 310 may be associated with an issuing bank associated with the physical medium, an acquiring bank (or merchant bank) associated with the merchant and/or the terminal, and/or a transaction card association (e.g., VISA® or MASTERCARD®) associated with the physical medium. Based on receiving information associated with the physical medium from the terminal, one or more devices of the processing system 310 may communicate to authorize an exchange and/or to transfer funds from an account associated with the physical medium to an account of an entity (e.g., a merchant) associated with the terminal.

The account profile database 320 includes one or more devices capable of receiving, generating, storing, processing, and/or providing information associated with supplementing records stored in a database for retrieval, as described elsewhere herein. The account profile database 320 may include a communication device and/or a computing device. For example, the account profile database 320 may include a data structure, a database, a data source, a server, a database server, or a similar type of device. As an example, the account profile database 320 may store account information, including an account identifier, records of interactions completed by a user (e.g., interaction data and one or more categories associated with the interaction), and contact information of the user, as described elsewhere herein. The stored records may be of all types of interactions (e.g., withdrawals of cash, deposits of cash, cash back from a transaction, card transactions, etc.). Additionally, the account profile database 320 may store account information, including account identifiers, of multiple other users, and records of interactions completed by the other users, and contact information of the other users.

The user device 330 includes one or more devices capable of receiving, generating, storing, processing, and/or providing information associated with supplementing records stored in a database for retrieval, as described elsewhere herein. The user device 330 may include a communication device and/or a computing device. For example, the user device 330 may include a wireless communication device, a mobile phone, a laptop computer, a tablet computer, a desktop computer, or a similar type of device.

The terminal 340 includes one or more devices capable of facilitating an interaction (e.g., an exchange or transaction) with a user (e.g., an account holder). For example, the terminal 340 may include an automated teller machine (ATM), a kiosk (e.g., a financial service kiosk), a secure access terminal (e.g., a terminal equipped with an encrypted connection to a server and/or database), a point-of-sale (PoS) terminal, and/or a payment terminal (e.g., a credit card terminal, a contactless payment terminal, a mobile credit card reader, or a chip reader). The terminal 340 may include one or more input components and/or one or more output components to facilitate obtaining data (e.g., account information) from a physical medium (e.g., a transaction card, a mobile device executing a banking application, or the like) and/or to facilitate interaction with the user. Example input components of the terminal 340 include a number keypad, a touchscreen, a magnetic stripe reader, a chip reader, and/or an RF signal reader (e.g., an NFC reader). Example output devices of the terminal 340 include a display and/or a speaker.

The entity profile database 350 includes one or more devices capable of receiving, generating, storing, processing, and/or providing information associated with supplementing records stored in a database for retrieval, as described elsewhere herein. The entity profile database 350 may include a communication device and/or a computing device. For example, the entity profile database 350 may include a data structure, a database, a data source, a server, a database server, or a similar type of device. As an example, the entity profile database 350 may store information on one or more entities (e.g., merchants), including, for each entity, an entity profile identifier, contact information of the entity, a geographic location of the entity, and/or a category of the entity, as described elsewhere herein.

The network 360 includes one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 4:
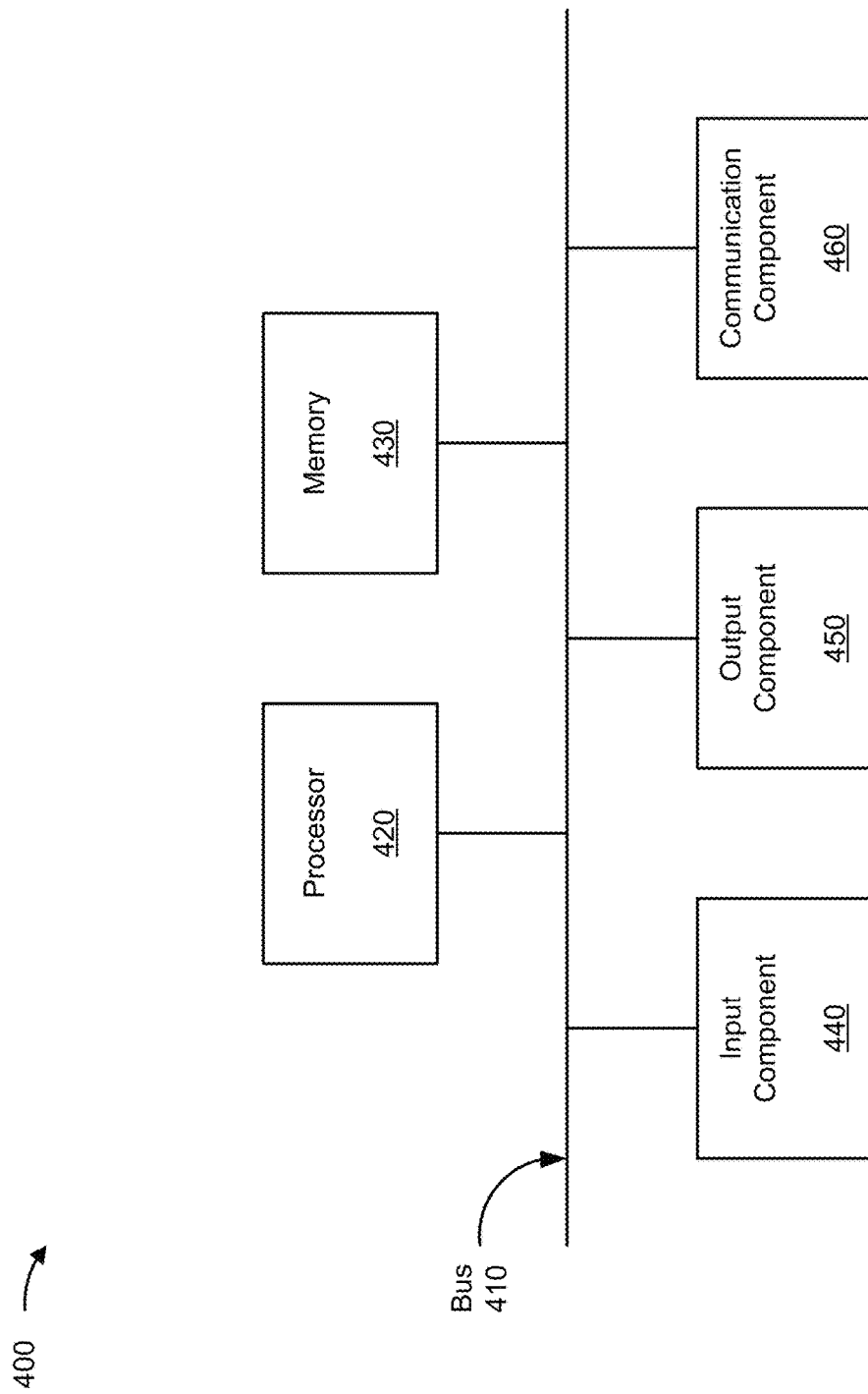
FIG. 4 is a diagram of example components of one or more devices of FIG. 2.

FIG. 4 is a diagram of example components of a device 400, which may correspond to the processing system 310, the account profile database 320, the user device 330, the terminal 340, and/or the entity profile database 350. In some implementations, the processing system 310, the account profile database 320, the user device 330, the terminal 340, and/or the entity profile database 350 include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry is used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
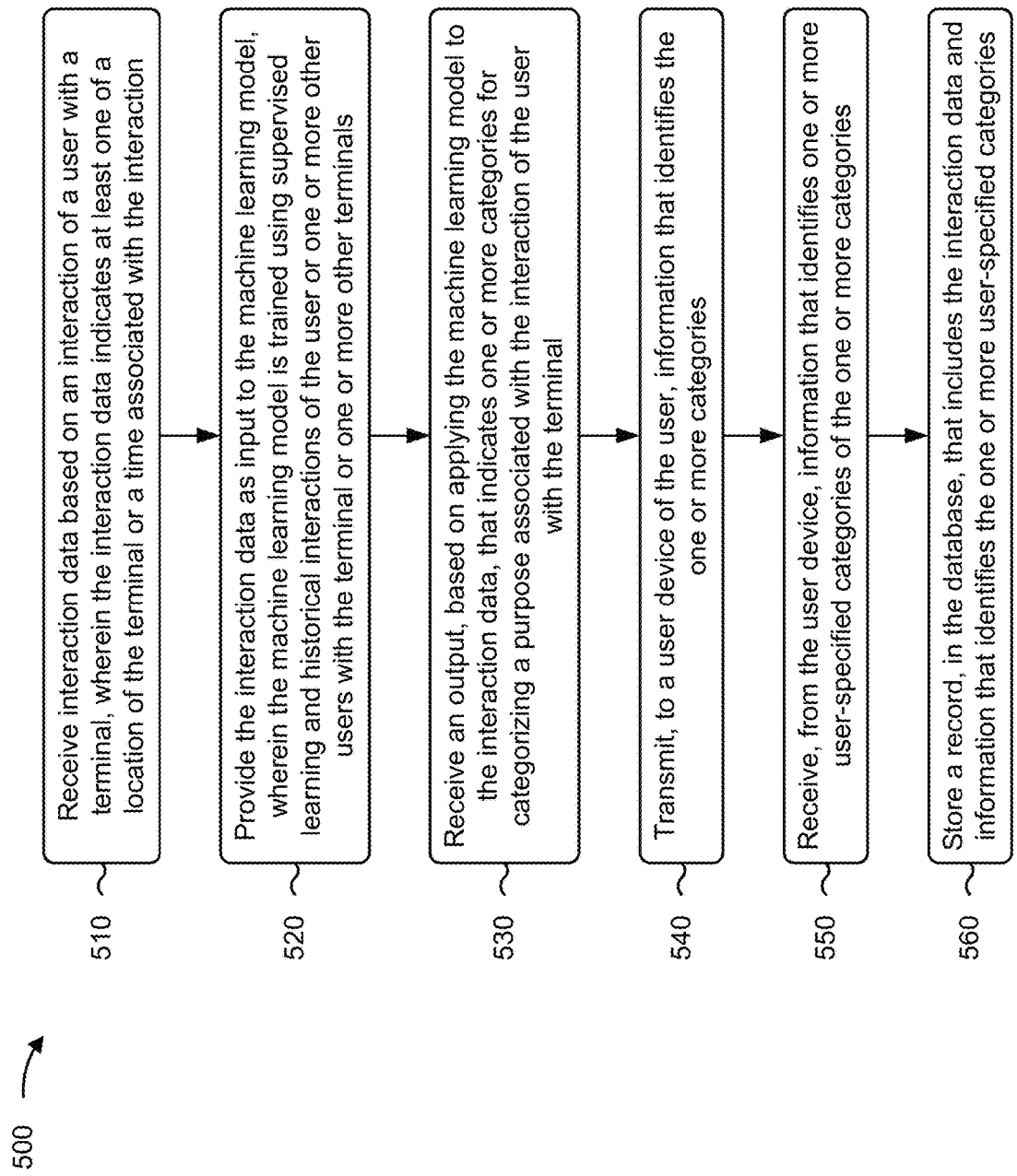
FIGS. 5 and 6 are flowcharts of example processes relating to supervised and/or unsupervised machine learning models for supplementing records stored in a database for retrieval.

FIG. 5 is a flowchart of an example process 500 associated with supervised and/or unsupervised machine learning models for supplementing records stored in a database for retrieval. In some implementations, one or more process blocks of FIG. 5 may be performed by a system (e.g., processing system 310). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include receiving interaction data based on an interaction of a user with a terminal, wherein the interaction data indicates at least one of a location of the terminal or a time associated with the interaction (block 510). As further shown in FIG. 5, process 500 may include providing the interaction data as input to the machine learning model, wherein the machine learning model is trained using supervised learning and historical interactions of the user or one or more other users with the terminal or one or more other terminals (block 520). As further shown in FIG. 5, process 500 may include receiving an output, based on applying the machine learning model to the interaction data, that indicates one or more categories for categorizing a purpose associated with the interaction of the user with the terminal (block 530). As further shown in FIG. 5, process 500 may include transmitting, to a user device of the user, information that identifies the one or more categories (block 540). As further shown in FIG. 5, process 500 may include receiving, from the user device, information that identifies one or more user-specified categories of the one or more categories (block 550). As further shown in FIG. 5, process 500 may include storing a record, in the database, that includes the interaction data and information that identifies the one or more user-specified categories (block 560).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
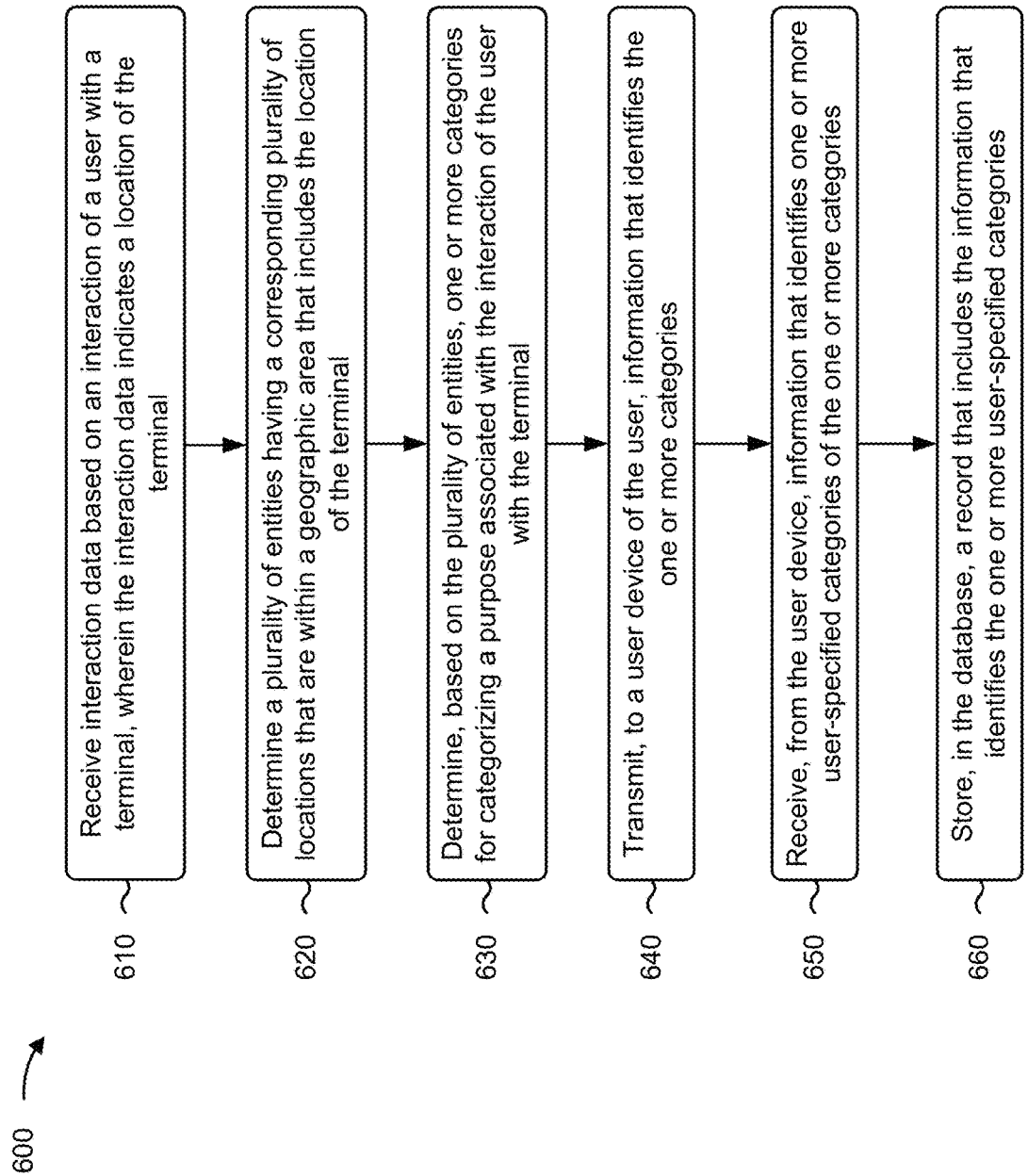

FIG. 6 is a flowchart of an example process 600 associated with supervised and/or unsupervised machine learning models for supplementing records stored in a database for retrieval. In some implementations, one or more process blocks of FIG. 6 may be performed by a system (e.g., processing system). Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving interaction data based on an interaction of a user with a terminal, wherein the interaction data indicates a location of the terminal (block 610). As further shown in FIG. 6, process 600 may include determining a plurality of entities having a corresponding plurality of locations that are within a geographic area that includes the location of the terminal (block 620). As further shown in FIG. 6, process 600 may include determining, based on the plurality of entities, one or more categories for categorizing a purpose associated with the interaction of the user with the terminal (block 630). As further shown in FIG. 6, process 600 may include transmitting, to a user device of the user, information that identifies the one or more categories (block 640). As further shown in FIG. 6, process 600 may include receiving, from the user device, information that identifies one or more user-specified categories of the one or more categories (block 650). As further shown in FIG. 6, process 600 may include storing, in the database, a record that includes the information that identifies the one or more user-specified categories (block 660).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for applying a machine learning model to supplement one or more records stored in a database for retrieval, the system comprising:
   one or more memories; and
   one or more processors, communicatively coupled to the one or more memories, configured to:
      receive interaction data based on an interaction of a user with a terminal, wherein the interaction data indicates a location of the terminal and a time associated with the interaction;
      provide the interaction data as input to the machine learning model, wherein the machine learning model is trained using supervised learning and historical interactions of the user or one or more other users with the terminal or one or more other terminals;
      receive an output, based on applying the machine learning model to the interaction data, that indicates one or more categories for categorizing a purpose associated with the interaction of the user with the terminal, wherein the one or more categories are based on the location of the terminal and the time associated with the interaction, and wherein the one or more categories are identified based on one or more entities within a geographic area that includes or is near the terminal used in the interaction;
      transmit, to a user device of the user, information that identifies the one or more categories;

receive, from the user device, information that identifies one or more user-specified categories of the one or more categories;
store a record, in the database, that includes the interaction data and information that identifies the one or more user-specified categories;
receive a query that indicates a requested category of the one or more user-specified categories;
retrieve a set of records from the database based on the query, wherein the set of records includes the record; and
provide the set of records to a device for display.

2. The system of claim 1, wherein the user is associated with an account identifier stored in the database,
wherein each of the one or more other users is associated with a corresponding account identifier stored in the database, and the historical interactions of each of the one or more other users is associated with the corresponding account identifier, and
wherein the one or more processors are further configured to provide, to the machine learning model, historical interaction data associated with the one or more other users based on the corresponding account identifier associated with each other user.

3. The system of claim 1, wherein the interaction data further indicates an amount associated with the interaction.

4. The system of claim 1, wherein the machine learning model is further trained using unsupervised learning to determine a cluster of terminals to which the terminal belongs, the cluster of terminals being based on at least one of:
locations of the terminals being in a same geographic area; or
proximity of the terminals to a same entity or category of entity,
wherein the historical interactions used to train the machine learning model are based on the cluster of terminals.

5. The system of claim 1, wherein the machine learning model is further trained using unsupervised learning to determine a cluster of users to which the user belongs, the cluster of users being based on at least one of:
demographic information of the users; or
historical interaction data of the users,
wherein the historical interactions used to train the machine learning model are based on the cluster of users.

6. The system of claim 1, wherein the one or more processors are further configured to:
transmit, to the user device, an instruction that causes the user device to provide an entry field for display; and
receive, from the user device and after transmitting the instruction, a message indicating a category for categorizing the purpose associated with the interaction of the user with the terminal,
wherein the category indicated by the message is different from the one or more categories indicated by the output received based on applying the machine learning model to the interaction data.

7. The system of claim 6, wherein the one or more processors are further configured to retrain the machine learning model based on the category indicated by the message.

8. A system for applying a machine learning model to supplement one or more records stored in a database for retrieval, the system comprising:
one or more memories; and
one or more processors, communicatively coupled to the one or more memories, configured to:
receive first interaction data based on a first interaction of a first user with a first terminal, wherein the first interaction data indicates a location of the first terminal and a time associated with the first interaction;
receive, from a first user device, information that identifies a user-specified category associated with the first interaction;
store a record, in the database, that includes the first interaction data and the information that identifies the user-specified category;
train a machine learning model based on the user-specified category and the first interaction data;
receive second interaction data based on a second interaction of a second user with a second terminal, wherein the second interaction data indicates a location of the second terminal and a time associated with the second interaction; and
transmit, to a second user device, information that identifies one or more categories for categorizing a purpose associated with the second interaction, wherein the one or more categories are determined by the trained machine learning model based on the location of the second terminal, the time associated with the second interaction, and one or more entities within a geographic area that includes or is near the second terminal used in the second interaction.

9. The system of claim 8, wherein the one or more processors are further configured to:
receive, from the second user device, information that identifies one or more user-specified categories of the one or more categories; and
store another record, in the database, that includes the second interaction data and information that identifies the one or more user-specified categories of the second interaction.

10. The system of claim 9, wherein the one or more processors are configured to retrain the machine learning model based on at least the one or more user-specified categories of the second interaction.

11. The system of claim 8, wherein at least one of:
the first user and the second user are the same user; or
the first terminal and the second terminal are the same terminal.

12. The system of claim 8, wherein at least one of the first interaction data or the second interaction data indicates a type of interaction, and
wherein the machine learning model is further trained based on the type of interaction of the at least one of the first interaction data or the second interaction data being the same as types of interactions indicated by other interaction data stored as part of records in the database.

13. A method for applying a machine learning model to supplement one or more records stored in a database for retrieval, comprising:
receiving, by a system, interaction data based on an interaction of a user with a terminal, wherein the interaction data indicates a location of the terminal and a time associated with the interaction;
determining, by the system, a plurality of entities having a corresponding plurality of locations that are within a geographic area that includes the location of the terminal;
determining, by the system and based on the plurality of entities, one or more categories for categorizing a purpose associated with the interaction of the user with the terminal, wherein the one or more categories are based on the location of the terminal and the time associated with the interaction, and wherein the one or more categories are identified based on one or more entities within a geographic area that includes or is near the terminal used in the interaction;

transmitting, by the system and to a user device of the user, information that identifies the one or more categories;

receiving, by the system and from the user device, information that identifies one or more user-specified categories of the one or more categories; and storing, by the system and in the database, a record that includes the information that identifies the one or more user-specified categories.

14. The method of claim 13, further comprising:
identifying, by the system, one or more entities having a category that corresponds to at least one of the one or more categories, the one or more entities satisfying one or more conditions in connection with the interaction; and transmitting, by the system and to the user device, information that identifies the one or more entities.

15. The method of claim 14, wherein the one or more conditions include at least one of:
the one or more entities being within a geographic area of the user device within a threshold amount of time from the time associated with the interaction; or the one or more entities being within a geographic area of the terminal.

16. The method of claim 13, further comprising:
grouping, by the system, the plurality of entities into groups, wherein each group of entities has a category that is common to entities in that group; and transmitting, by the system and to the user device, at least one of:
information that identifies the category of each of the groups; or
information that identifies each group of entities by the category of the group.

17. The method of claim 13, further comprising:
receiving, by the system and from the user device, an input as audio or an image that corresponds to a note associated with the interaction; and storing, by the system and in the database, the input in association with the record.

18. The method of claim 13, wherein determining the one or more categories is further based on a set of records stored in the database, wherein each record of the set of records includes information that identifies one or more user-specified categories of a past interaction associated with that record.

19. The method of claim 13, wherein the interaction data further indicates whether the interaction is a withdrawal of funds or a deposit of funds.

20. The method of claim 13, wherein the interaction data further indicates an amount associated with the interaction.

* * * * *